(12) United States Patent
Oakley et al.

(10) Patent No.: US 6,525,867 B1
(45) Date of Patent: Feb. 25, 2003

(54) FAST RESPONSE MICRO-MODULATOR ARRAYS

(75) Inventors: William S. Oakley, Burlingame, CA (US); Mahdad Manavi, San Jose, CA (US); Qi-Ze Shu, Cupertino, CA (US)

(73) Assignee: Lots Technology, Inc., Longmont, CO (US)

( * ) Notice: Subject to any disclaimer, the term of this patent is extended or adjusted under 35 U.S.C. 154(b) by 43 days.

(21) Appl. No.: 09/603,106

(22) Filed: Jun. 22, 2000

Related U.S. Application Data
(60) Provisional application No. 60/142,549, filed on Jul. 7, 1999.

(51) Int. Cl.$^7$ .............................. G02F 1/00; G02F 1/03; H01Q 13/00
(52) U.S. Cl. ................ 359/323; 359/322; 359/245; 359/248; 343/786; 250/214.1
(58) Field of Search .................... 359/245, 248, 359/251, 254, 261, 258, 320, 322, 323, 332, 619, 326; 349/106, 122; 343/786, 772; 250/214.1

(56) References Cited

U.S. PATENT DOCUMENTS

| | | | | |
|---|---|---|---|---|
| 5,325,228 A | * | 6/1994 | Matsubara et al. | 359/322 |
| 6,297,899 B1 | * | 10/2001 | Romanovsky | 359/245 |
| 6,310,712 B1 | * | 10/2001 | Romanovsky | 359/245 |

* cited by examiner

*Primary Examiner*—Loha Ben
(74) *Attorney, Agent, or Firm*—Blakely, Sokoloff, Taylor & Zafman LLP

(57) ABSTRACT

Micro fabricated arrays of optical modulators of both a surface electrode and machined mesa nature where the small structure size and low capacitance electrical connections permit each modulator element to be individually electrically addressed thus providing modulator optical rise and fall response times in the low and sub nanosecond range. Both sparsely spaced and closely packed arrays are achieved.

25 Claims, 13 Drawing Sheets

FAST RESPONSE MICRO-MODULATOR ARRAYS

CLAIM OF PRIORITY

This application claims the benefit of United States Provisional Application No. 60/142,549, filed Jul. 7, 1999, entitled "Fast Response Micro-Modulator Arrays" by William S. Oakley and Mahdad Manavi.

BACKGROUND OF THE INVENTION

1. Field of the Invention

The present invention relates to electrically driven optical modulators.

2. Background Information

Many applications exist within the field of photonics for electrically driven two dimensional arrays of light gates or Spatial Light Modulators (SLM') with the ability to respond rapidly. These applications include projection display of video images, page composers for holographic data storage, optical computing including optical neural networks, multi-beam data storage, etc. Various techniques and materials have been employed to achieve these and similar devices. The materials from which SLM'are fabricated generally fall into one of several classes: micro-mechanical, liquid crystal, and electro-optic crystals and ceramics. Electro-optic crystals typically used include potassium dihydrogen phosphate (KDP), lithium niobate, lithium tantalate, ammonium dihydrogen phosphate (ADP), SrBaNiobate, BaNaNiobate, and several others.

One material typically used is PLZT, a transparent electro-optic ceramic made by sintering from a mixture of lead (P), lanthanum (L), zirconium (Z) and titanate (T). The material is fabricated in thin wafers transparent from about 400 nm throughout the visible spectrum and into the near infrared. Under an applied voltage this material exhibits either a linear Pockels or a quadratic Kerr effect, depending on the percentage of Lanthanum in the mixture which can be varied from about 7% to 12%. In both cases, the effect is voltage and temperature dependent, with operating temperatures starting from about 75° C. requiring larger driving voltages.

Historically, devices have been built as "windows" using numerous parallel electrodes to electrically switch significant areas of material, ranging from a few square millimeters to tens of square centimeters of material. The response times of these "window" devices have typically been longer than a microsecond, which is very slow compared to other electro-optic devices, which can demonstrate nanosecond response times.

SUMMARY OF THE INVENTION

The present invention provides an optical modulation apparatus having an elongated protrusion extending from a substrate. The protrusion defines a light path and has an outer surface. A conductive element is disposed on at least a portion of the outer surface. In one embodiment of the present invention, the elongated protrusion includes a first material and the substrate includes a second material.

The present invention also provides a method for forming an optical modulation apparatus. One embodiment of the method includes: making a plurality of intersecting cuts into a substrate of an electro-optic material such that a plurality of protrusions extend from a portion of the substrate; reducing the side surfaces of each of the protrusions; coating at least a portion of the side surfaces with an electrically conductive materials; and connecting the electrically conductive material to a voltage driving element.

Additional features and benefits of the present invention will become apparent upon review of the following description.

BRIEF DESCRIPTION OF THE DRAWINGS

Various embodiments of the present invention will be described in detail with reference to the following drawings. The present invention is illustrated by way of example and not limitation in the accompanying figures.

DETAILED DESCRIPTION

The following description provides embodiments of the present invention. However, it will be appreciated that other embodiments of the present invention will become apparent to those of ordinary skill in the art upon examination of this description. Thus, the present description and accompanying drawings are for purposes of illustration and are not to be used to construe the invention in a restrictive manner.

Figure 1:
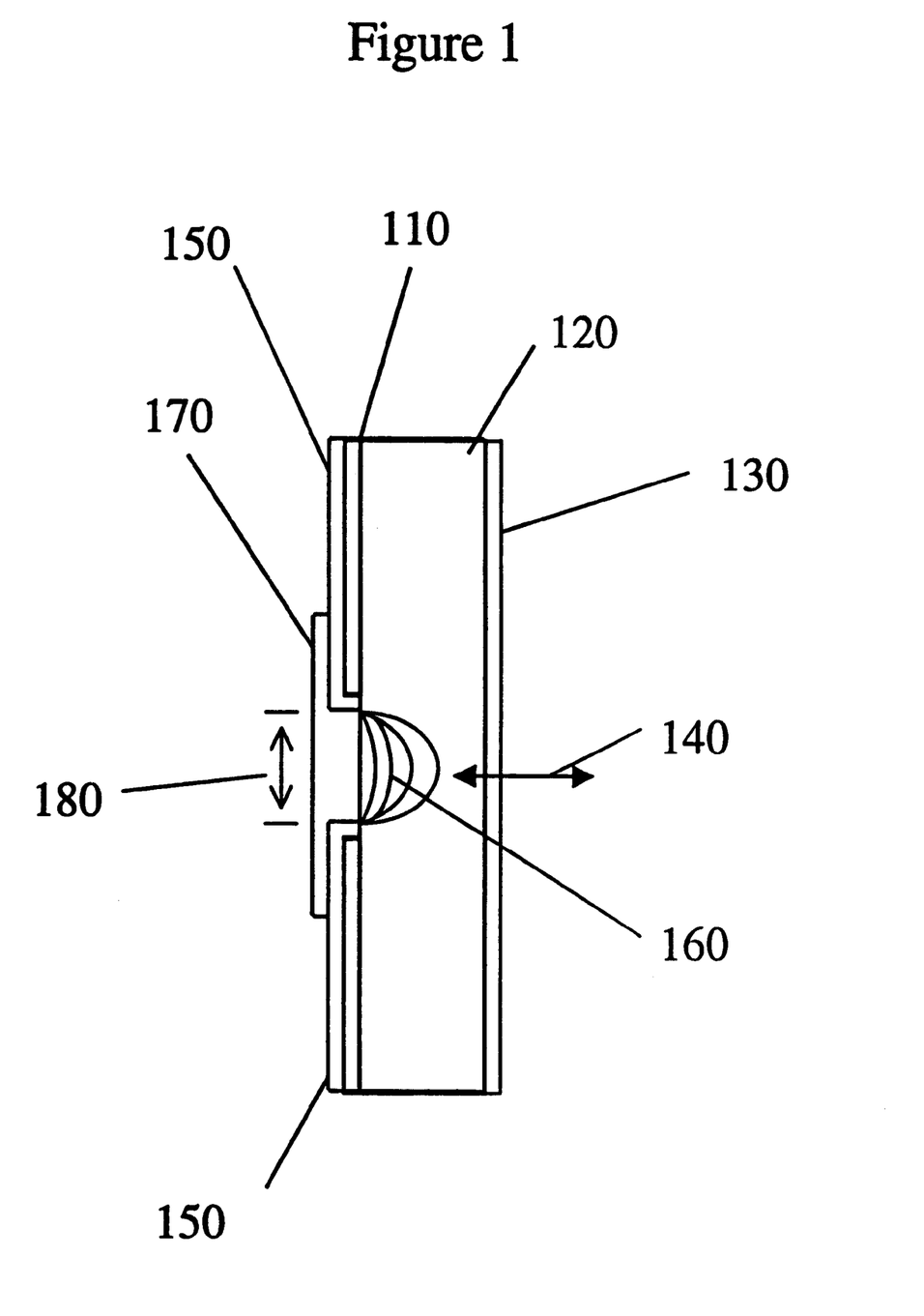
FIG. 1 illustrates an example of planar optical modulator geometry.

Electro-optic structures are based on a fringing electric field 160 which penetrates into a substrate 120, such as a PLZT substrate, when surface electrodes 150 are implemented as shown in FIG. 1. For typical large window devices the driving voltages are in the several hundreds of volts range. In this configuration, the depth of field penetration into the material is about the same as the gap width 180 separating the electrodes 150. The devices typically operate as optical polarization modulators by passing a polarized optical beam 140 through the gap between the electrodes 150 such that the electric field vector is at 45 degrees to the electric field orientation imposed by the electrodes 150. An anti-reflective coating 130 on one side of substrate 120 permits the light beam 140 to enter and leave substrate 120. A reflective coating 170 on the other side of substrate 120 reflects the light beam 140 back to the area at which it entered substrate 120. The applied field 160 causes a change in the optical index of substrate 120 in a direction along the field 160. The difference in optical index in a direction parallel to the field 160 compared to that transverse to the field 160 causes a differential propagation velocity between the respective components of the impinging light wave 140 and thereby a path length dependent phase delay between these components.

Thus, the switching effect is due to the fringing electric field 160 which penetrates substrate 120 and where the conductive traces 150 are insulated from substrate 120 by an intervening layer 110 of dielectric such as a one micron thick layer of deposited silicon dioxide.

The present invention includes two-dimensional arrays of micro-optical shutters using both surface electrodes and "mesa structures" or "posts". These devices have optical apertures in the low tens of micron range (e.g. 20 to 70 microns) and exhibit switching times of a few nanoseconds or less. The slow response time of the larger structures is not due to any inherent material property but rather is due to the capacitance effects deriving from the large size structures and the high dielectric constant of the material. Microstructures therefore allow very fast response times. A new, previously unrecognized, family of useful photonic switching structures with very fast response times is therefore possible.

The micro-structure arrays of the present invention have optical path lengths of nominally 100 microns that achieve switching of the input light in a few nanoseconds using applied voltages of about one volt or less per micron of aperture; e.g. 50 volts for a 50 micron wide optical aperture. If reconfigured as reflective devices having 40 micron apertures operating at an optimum temperature, the drive voltage required is less than fifty volts. With appropriate lanthanum content and temperature selection the drive voltage can be reduced. The drive voltage required to achieve 90 degree polarization switching is a function of both the material temperature and composition, particularly the amount of lanthanum in the mixture. Typical lanthanum content ranges from about 7.5% to 9.5% with the lower amount being better suited for higher temperature operation but having less optical transmission. The surface electrode and mesa micro fabrication techniques of the present invention give rise to many possible photonic devices, in transmission or reflection, for analog or digital or optical phase modulation and recording, configured as one or two dimensional arrays, some with spatially matched lens-let arrays, etc.

Figure 2:
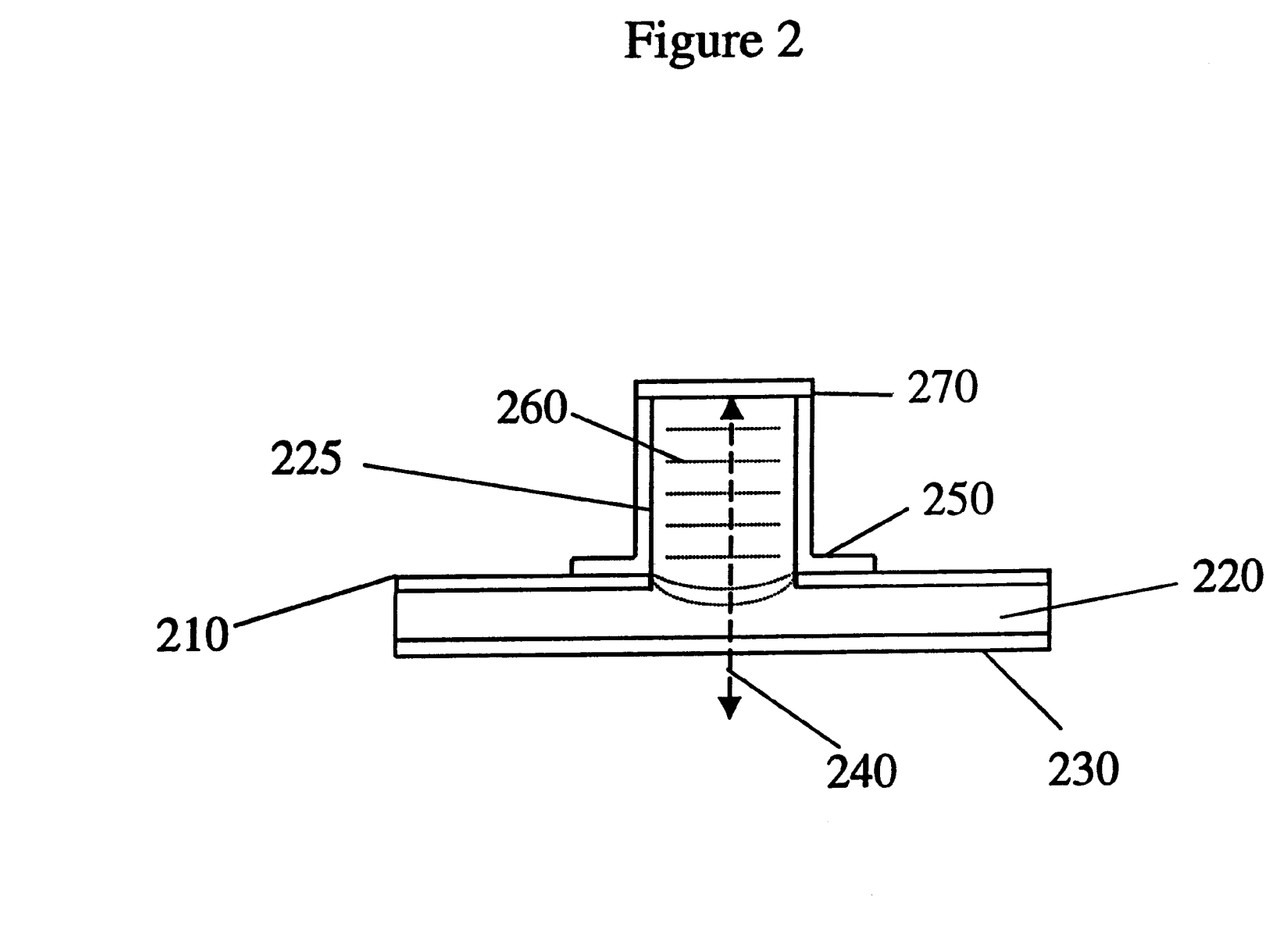
FIG. 2 illustrates a modulator mesa in accordance with the teachings of the present invention.

FIG. 2 illustrates a modulator mesa according to one embodiment of the present invention. A block of an electro-optic material is machined or etched to form a remaining substrate 220 having a mesa or post 225 extending therefrom. It is appreciated that mesa 225 is not limited to having any particular cross-sectional shape. A layer 230 of anti-reflective material is coated onto one surface of substrate 220 to permit a light beam 240 to enter and leave substrate 220. A layer 210 of insulating or dielectric material may be coated onto an opposing surface of substrate 220 to insulate the surface of substrate 220 from conductive elements 250. Conductive elements (e.g. electrodes) 250 are placed on at least a portion of the side surface(s) of the mesa 225. Mesa 225 may be formed with a width, for example, between approximately 10 and 100 microns and a height to width ratio, for example, of approximately five to one (e.g. heights of approximately 50 to 500 microns, respectively). Different widths and heights may be used as desired. It should be noted that increasing the height of mesa 225, and hence the optical path length of the light beam 240/applied field 260 interaction, results in a decrease in the required drive voltage that is applied to conductive elements 250. Mesa 225 may be used in either a transmissive mode with anti-reflective coatings applied to both optical surfaces (at 230 and 270), or in a reflective mode with an anti-reflective coating 230 applied to one surface and a high reflective coating 270 applied to the other surface.

The electro-optic material from which mesa 225 and substrate 220 are formed may be one of any number of electro-optic materials such as: KDP, lithium niobate, lithium tantalate, ammonium dihydrogen phosphate ADP, SrBaNiobate, BaNaNiobate, and PLZT. It is appreciated that mesa 225 and substrate 220 may not be of the same material. For example, mesa 225 and substrate 220 may be formed separately from different materials and then coupled together to form a mesa structure. In such an embodiment of the present invention, mesa 225 may be formed of an electro-optic material and substrate 220 may be formed of an optical material, but not necessarily an electro-optic material. Alternatively, substrate 220 may be formed of a non-optical material, in which case substrate 220 may be used as a reflective element to reflect light beams which enter mesa 225 from optical surface 270.

Figure 3:
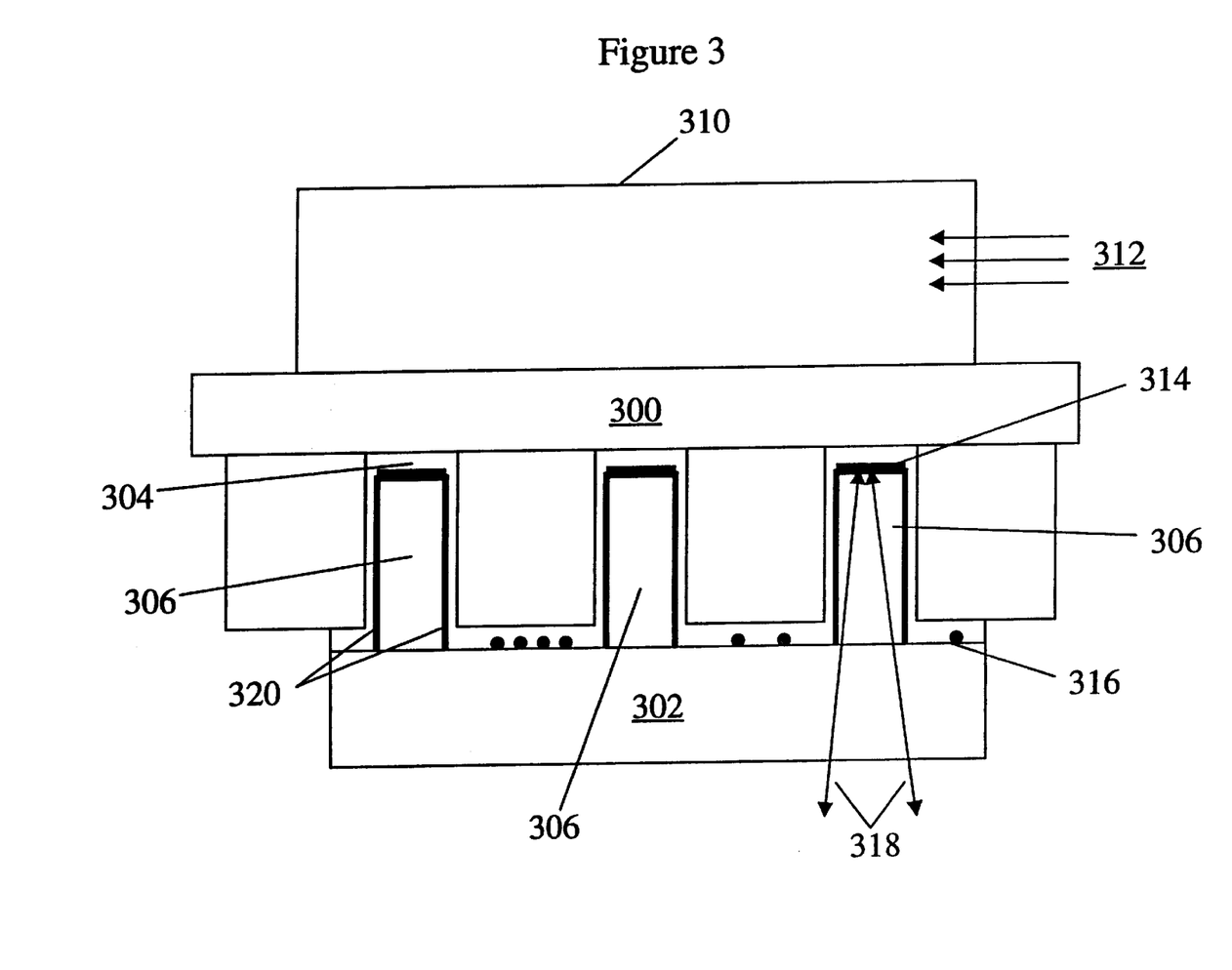
FIG. 3 illustrates an embodiment of an array of modulator mesas in accordance with the teachings of the present invention.

FIG. 3 illustrates an array of modulator mesas 306 according to one embodiment of the present invention. Due to the high dielectric properties of electro-optic materials (e.g. substrate 302 and mesas 306) and their low thermal conductivity, it may be desirable in many applications to dissipate the heat that is generated by driving at higher frequencies. The performance of modulator mesas can be improved by controlling the operating temperature of the mesas. The present invention includes array devices with optical modulation rates of tens of megahertz and light modulation rise-and-fall times of a few nanoseconds. Because such devices are capable of generating increasing amounts of heat, they may benefit significantly from heat-sinking.

An array of mesas 306 extend from substrate 302. Mesas 306 may be located at regular intervals along substrate 302. Electrodes 320 are located on the side surface(s) of mesas 306. Conductive traces 316 on the surface of substrate 302 or the surface of a dielectric layer (not shown) on substrate 302 provide an electrical connection to electrodes 320. A reflective coating 314 caps the end of each mesa 306 to reflect input light 318 which has passed through substrate 302 and entered the light path defined by each mesa 306. An anti-reflective layer (not shown) may be coated on the exposed surface of substrate 302. A thermally conductive substrate 300 is placed over mesas 306 and substrate 302. Thermally conductive substrate 300 is shown with extensions between mesas 306 to increase the surface area available for heat transfer. A thermally conductive filler material 304, such as a diamond filled silica gel, may be used to fill the gaps between substrate 300 and substrate 302 and between substrate 300 and mesas 306. A heat sink 310 coupled to thermally conductive substrate 300 allows heat to be removed via air flow 312.

An array of micro mesa devices, such as mesas 306, may be fabricated by milling or sawing intersecting cuts into a block of electro-optic material, and then with the optical surfaces protected, further sawing or chemical etching of the mesa sides to provide smaller mesa widths. The sides of the mesas are then coated with metal to provide an electrical connection. It is appreciated that an array of modulator mesas may include one or more rows of modulator mesas depending and that the row(s) of modulator mesas may be regularly spaced or irregularly spaced.

Electrical connection to an array of mesas can be achieved by a variety of techniques including running electrically conductive traces to each electrode, and wire-bonding the other end of each trace to external circuitry via a connecting pad. This approach is suitable for small arrays where the number of traces is low. For larger arrays a multiple layered approach can be used where the electrical connections are implemented in a multi-layer printed circuit structure with connection to each modulator element being achieved by a local conductor.

One embodiment for larger arrays and/or high frequency operation is to form a multi-layer wafer where one layer includes a mesa array and another layer includes a spatially complementing conductive substrate, such as the one shown in FIG. 3. For independent operation of each mesa modulator, each mesa may be connected to and driven by an adjacent electrical element.

Figure 4A:
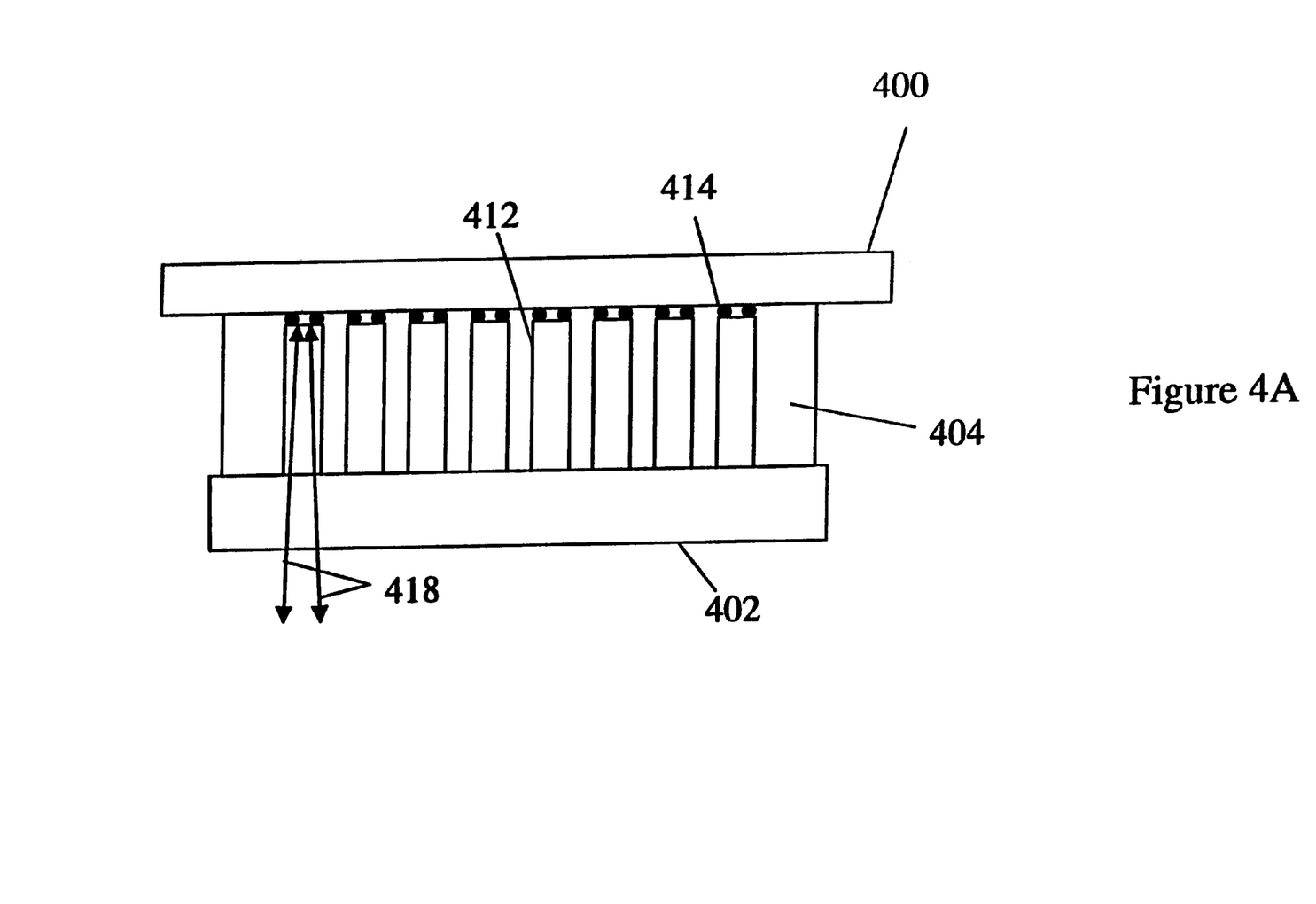
FIG. 4A illustrates another embodiment of an array of modulator mesas in accordance with the teachings of the present invention.
Figure 4B:
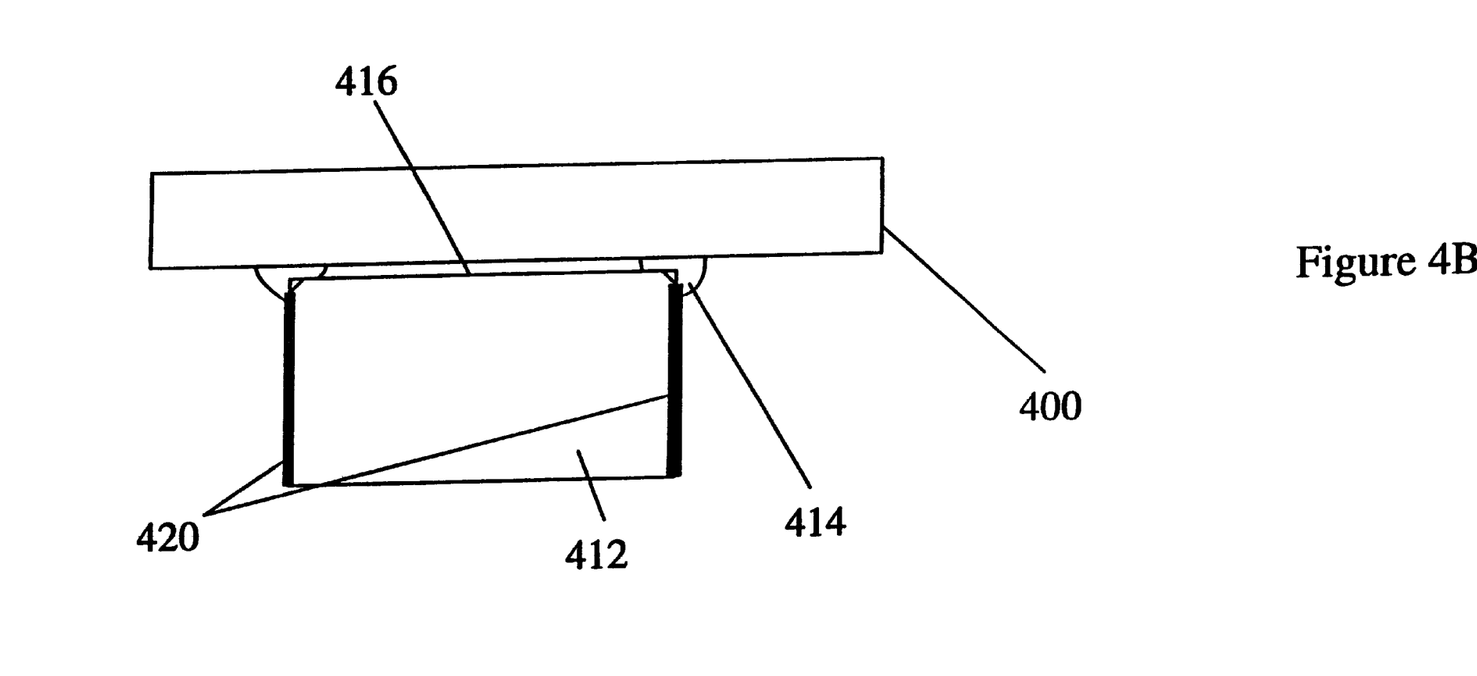
FIG. 4B illustrates a close-up view of electrical connections for an array of modulator mesas as shown in FIG. 4A.

Local connectivity between each mesa and its driving element may be achieved in a variety of ways. One way is by flow soldering or using "bump" connectors 414 as shown in FIGS. 4A and 4B. A drive wafer 400 having a plurality of conductive traces and/or pads (not shown) is pressed against modulator mesas 412 extending from substrate 402 such that a conductive trace/pad is electrically connected to an electrode 420 via bump connectors 414. Connecting each electrode 420 to its own conductive trace/pad on drive wafer 400 allows each modulator mesa 412 to be independently addressed. Thus, an electric field can be applied to each mesa 412 as desired. Drive wafer 400 may be fabricated using standard microcircuit technology. For high frequency operation, drive wafer 400 may be fabricated from a highly thermally conductive electrical insulator such as beryllium oxide or silicon nitride. Good thermal connection between the array of mesas 412 and drive wafer 400 is obtained by filling the gaps between them with a thermally conductive compound 404, such as a diamond filled silica gel. Because drive wafer 400 covers mesas 412, a reflective layer 416 is placed on the end of each mesa 412 such that light beam 418 can exit each mesa 412 and substrate 402.

Figure 4C:
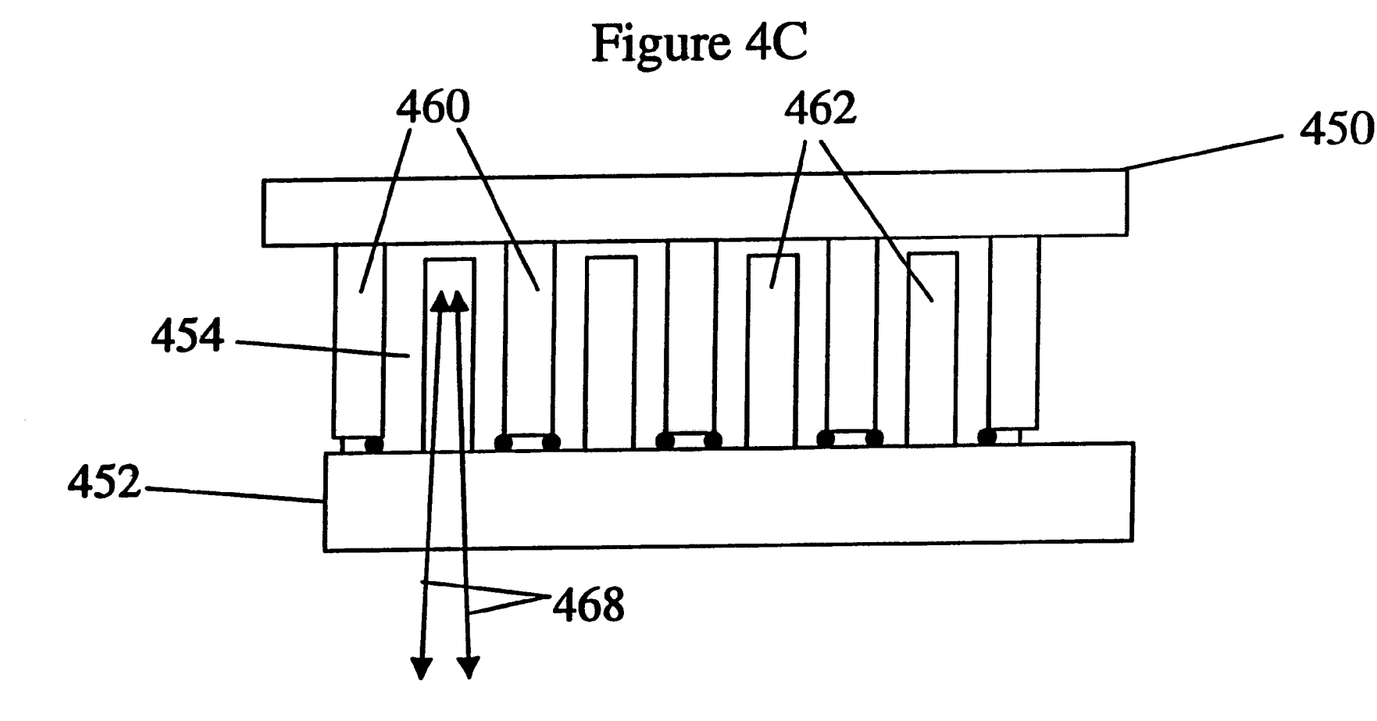
FIG. 4C illustrates yet another embodiment of an array of modulator mesas in accordance with the teachings of the present invention.
Figure 4D:
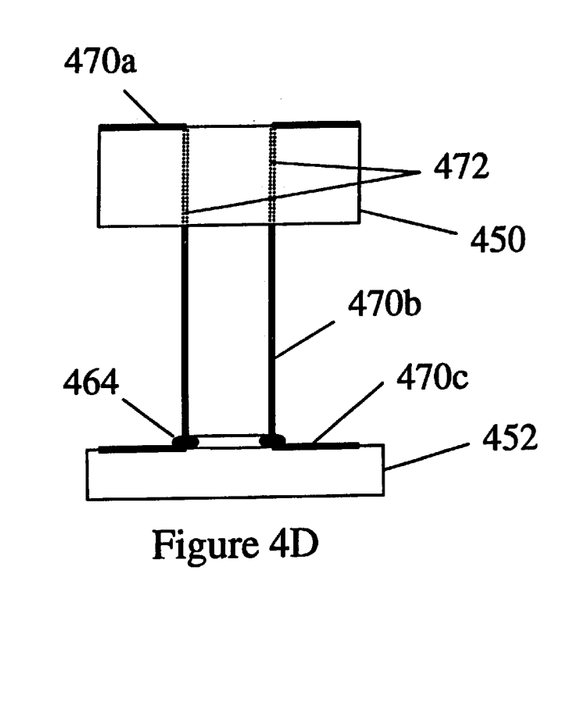
FIG. 4D illustrates a portion of an electrical connection scheme for an array of modulator mesas as shown in FIG. 4C.
Figure 4E:
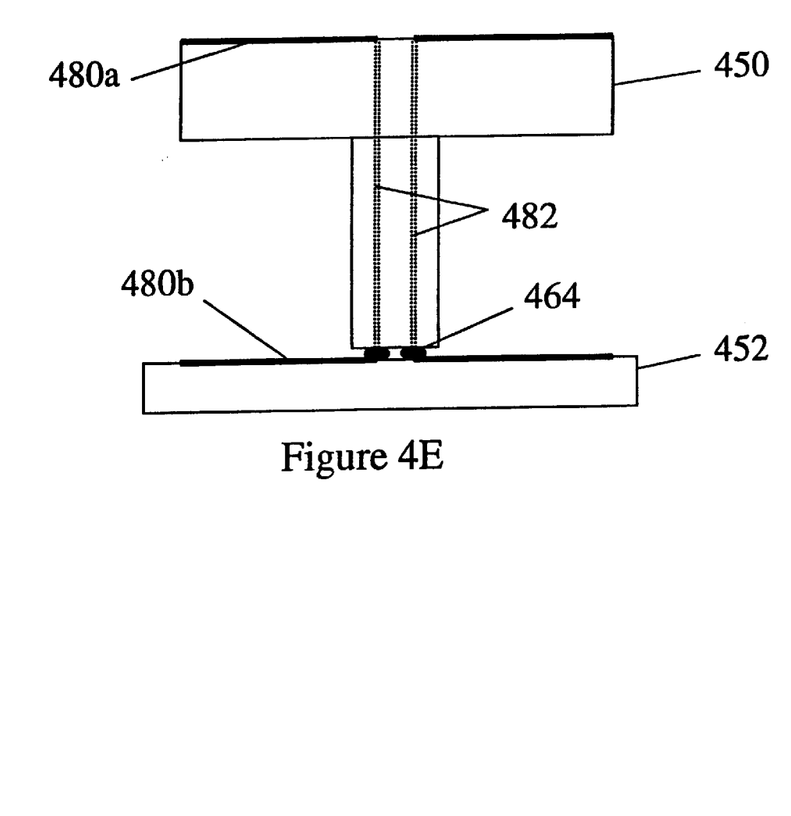
FIG. 4E illustrates a portion of another electrical connection scheme for an array of modulator mesas as shown in FIG. 4C.

FIG. 4C illustrates another embodiment of an array of modulator mesas 462, and FIGS. 4D and 4E illustrate electrical connection schemes for use with an array of modulator mesas as shown in FIG. 4C. A drive substrate 450 having a plurality of conductive traces and/or pads is affixed to substrate 452. For high frequency operation, drive substrate 450 may be fabricated from a highly thermally conductive electrical insulator such as beryllium oxide or silicon nitride. Modulator mesas 462 extending from substrate 452 provide an elongated optical path for light beam 468. Each mesa 462 may be coated with a reflective layer (not shown) to reflect light beam 468. Connectors 460 extend from drive substrate 450 and are coupled to substrate 452 via conductive bumps 464. It is appreciated that a dielectric layer may be placed on substrate 452 such that electrical connections/features are located on the dielectric layer rather than the surface of substrate 452. In one embodiment of the present invention, connectors 460 are formed in an array which physically complements the array of modulator mesas 462. A thermally conductive filler material 454 may be used to fill the gaps among drive substrate 450, mesas 462, connectors 460, and substrate 452.

As shown in FIG. 4D, electrical connections between conductive traces 470a and conductive traces 470c may be made through drive substrate 450. Conductive vias 472 connect conductive traces 470a and conductive traces 470b, which run along the side surface(s) of connector 460. Conductive traces 470b are coupled to conductive traces 470c via bumps 464. FIG. 4E illustrates an electrical connection scheme similar to that shown in FIG. 4D, except that conductive vias 482 extend all the way through drive substrate 450 and connector 460. Thus, traces 480a and 480b are electrically connected to each other by conductive vias 482 and bumps 464.

Figure 4F:
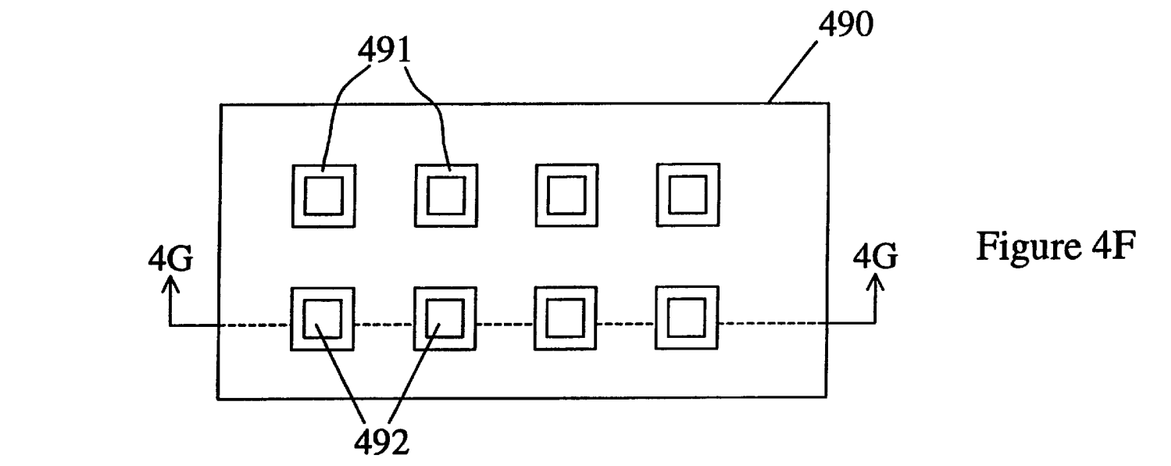
FIG. 4F illustrates a top view of still another embodiment of an array of modulator mesas in accordance with the teachings of the present invention.
Figure 4G:
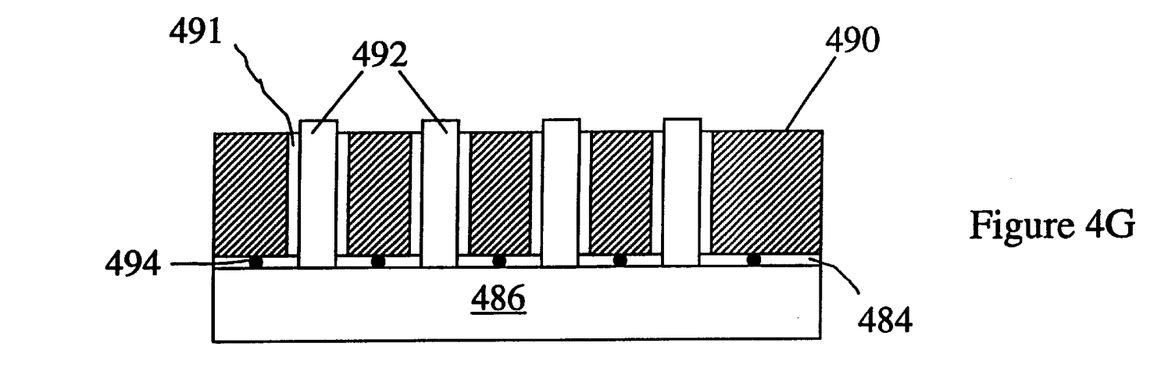
FIG. 4G illustrates a side cross-sectional view of the array of modulator mesas shown in FIG. 4F.
Figure 4H:
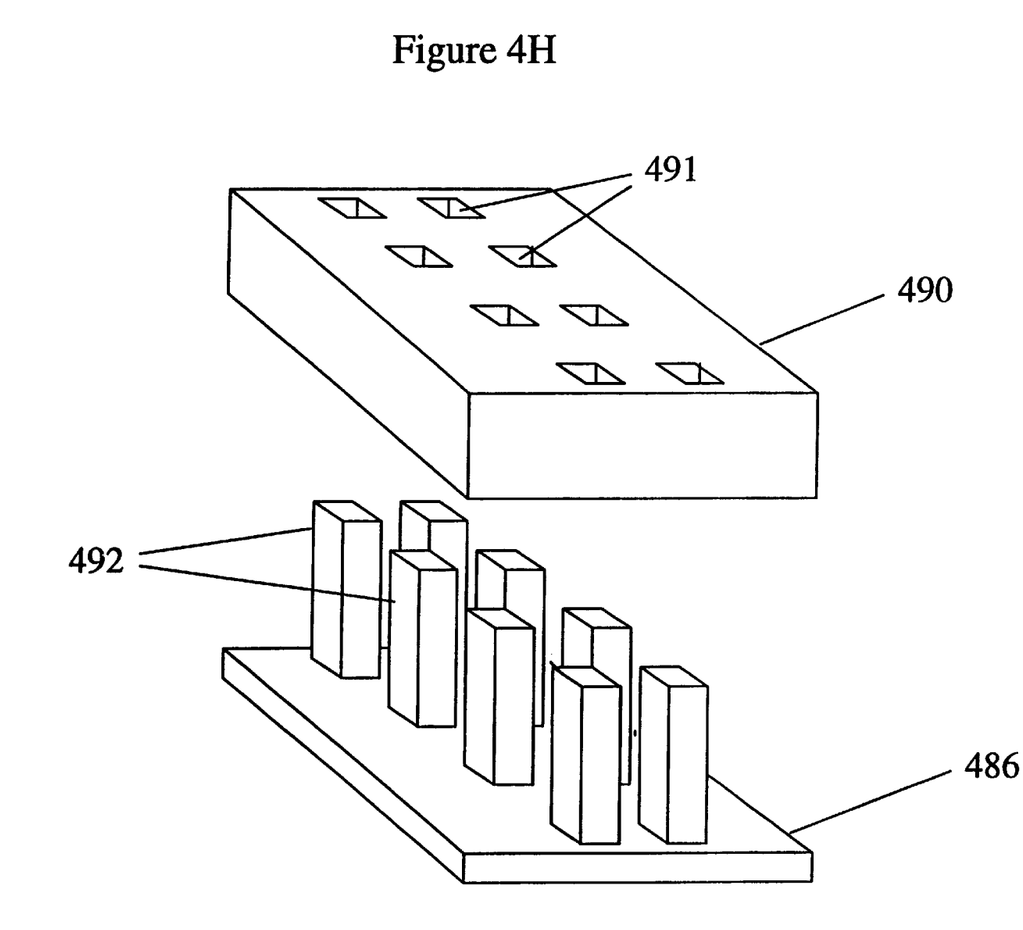
FIG. 4H illustrates a perspective view of the array of modulator mesas shown in FIG. 4F.

FIGS. 4F–4H illustrate a top view, a side cross-sectional view, and a perspective view, respectively, of another embodiment of an array of modulator mesas 492. A drive substrate 490 having a plurality of through holes 491 is mated with an array of modulator mesas 492 extending from a substrate 486. Each through hole 491 accommodates a separate mesa 492. Drive substrate 490 has a plurality of conductive traces and/or pads (not shown) which may be located on either side of drive substrate 490. For high frequency operation, drive substrate 490 may be fabricated from a highly thermally conductive electrical insulator such as beryllium oxide or silicon nitride. Conductive bumps 494 provide an electrical connection between the conductive traces/pads on drive substrate 490 and conductive traces (not shown) on the surface of substrate 486. A variety of electrical connection schemes, such as those discussed above in conjunction with FIGS. 4A–4E, may be used to connect the traces/pads on substrate 490 and the traces on substrate 486. Additionally, it is appreciated that the traces/pads on substrate 490 and the traces on substrate 486 may be directly connected to each other (e.g. compression bonded) without the use of bumps 494. A thermally conductive filler material 484 may be used to fill the gaps between mesas 492 and substrate 490 and between substrate 486 and substrate 490. It is appreciated that electrodes may be placed on the side surfaces of mesas 492 and that mesas 492 may be used in a reflective or transmissive mode. It should be noted that mesas 492 may be used in a transmissive mode because substrate 490 does not cover the ends of mesas 492.

Figure 5A:
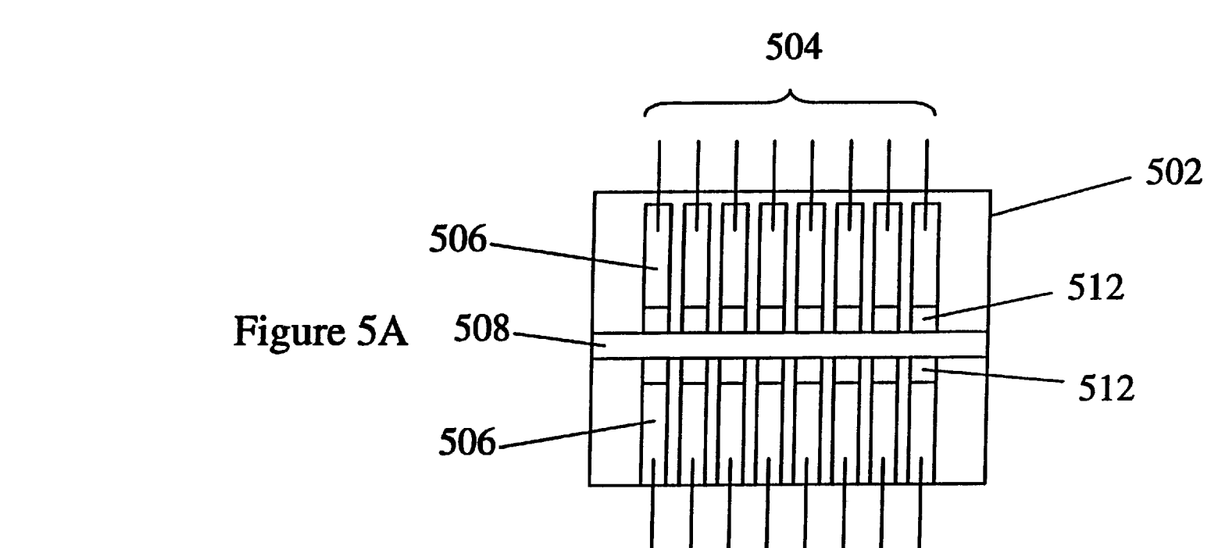
FIG. 5A illustrates a top view of an array of modulator mesas in accordance with the teachings of the present invention.
Figure 5B:
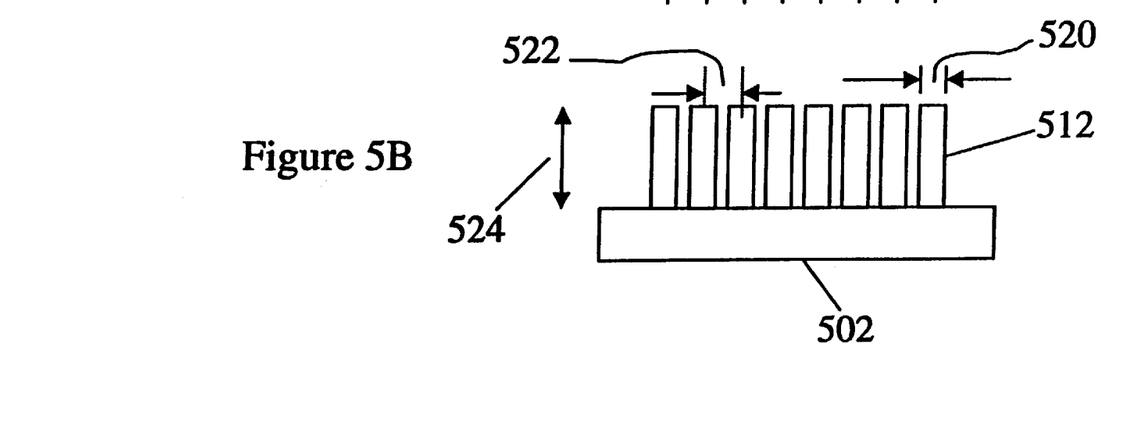
FIG. 5B illustrates a front planar view of the array of modulator mesas shown in FIG. 5A.
Figure 5C:
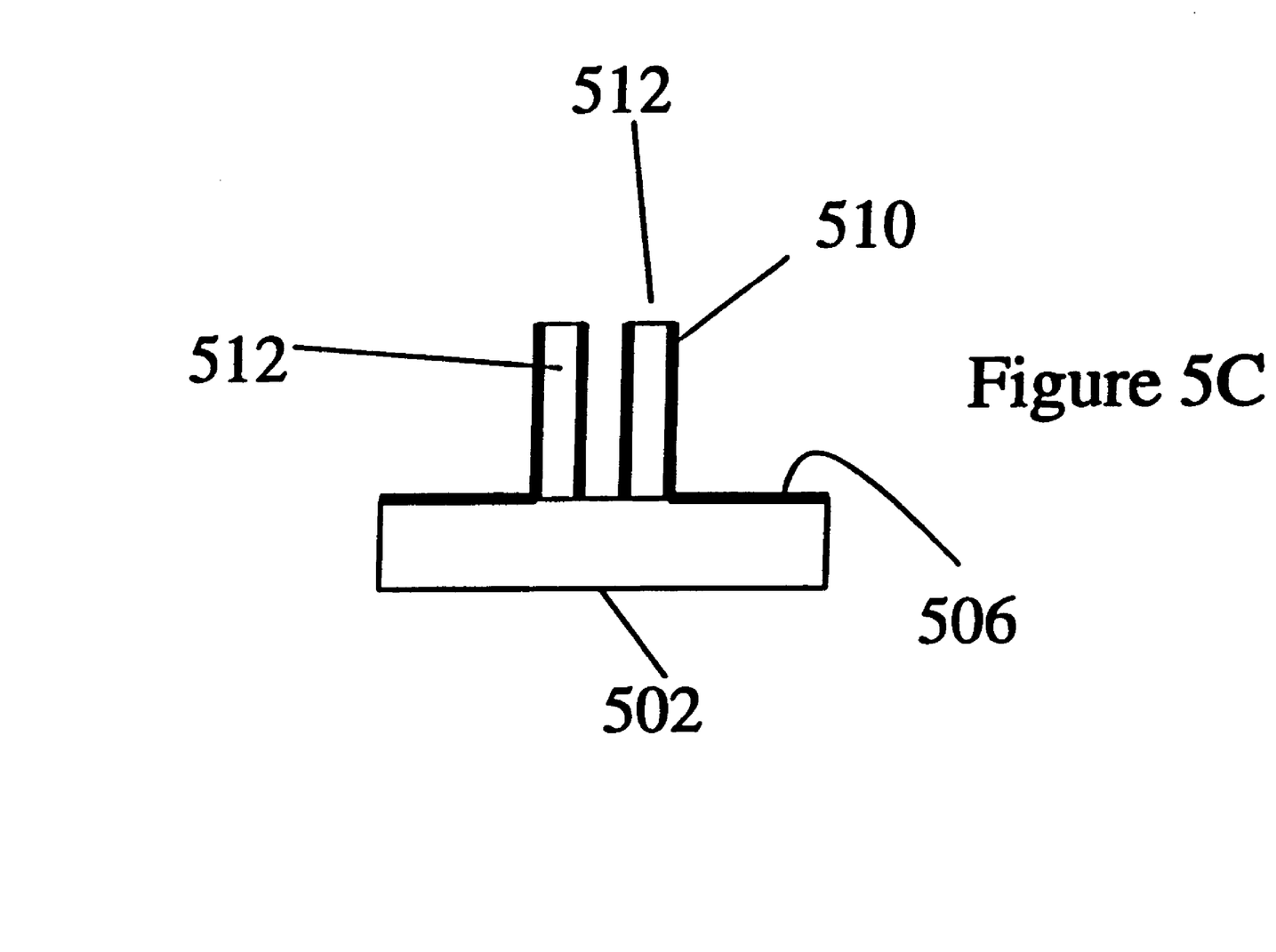
FIG. 5C illustrates a side planar view of the array of modulator mesas shown in FIG. 5A.

FIGS. 5A–5C show a top view, a front planar view, and a side planar view, respectively, of a 2×8 array of modulator mesas 512 where each light beam from an array of light beams is focused onto or through each modulator mesa 512. Mesas 512 extend from a substrate 502 and have electrodes 510 along their side surfaces. Conductive traces 506 on the surface of substrate 502 are coupled to electrodes 510. Alternatively, conductive traces 506 may be located on the surface of a dielectric layer residing on the surface of substrate 502. A common ground connection 508 may be used to ground some electrodes 510. For example, one electrode 510 on each mesa 512 may be grounded. Wire bond connections 504 are coupled to conductive traces 506 to transmit signal inputs from external circuitry. Because each mesa 512 is associated with its own wire bond connection 504, each mesa 512 may be individually addressed.

In one embodiment of the present invention, mesas 512 are spaced at regular intervals. For example, mesas 512 may be spaced by a center-to-center distance 522 of approximately 250 microns. As a further example, mesas 512 may have a width 520 of approximately 100 microns and a height 524 of approximately 400 microns. Although each mesa 512 is shown as having a square cross-sectional area, it is appreciated that the modulator elements of the present invention are not limited to having square cross-sectional areas.

Figure 6A:
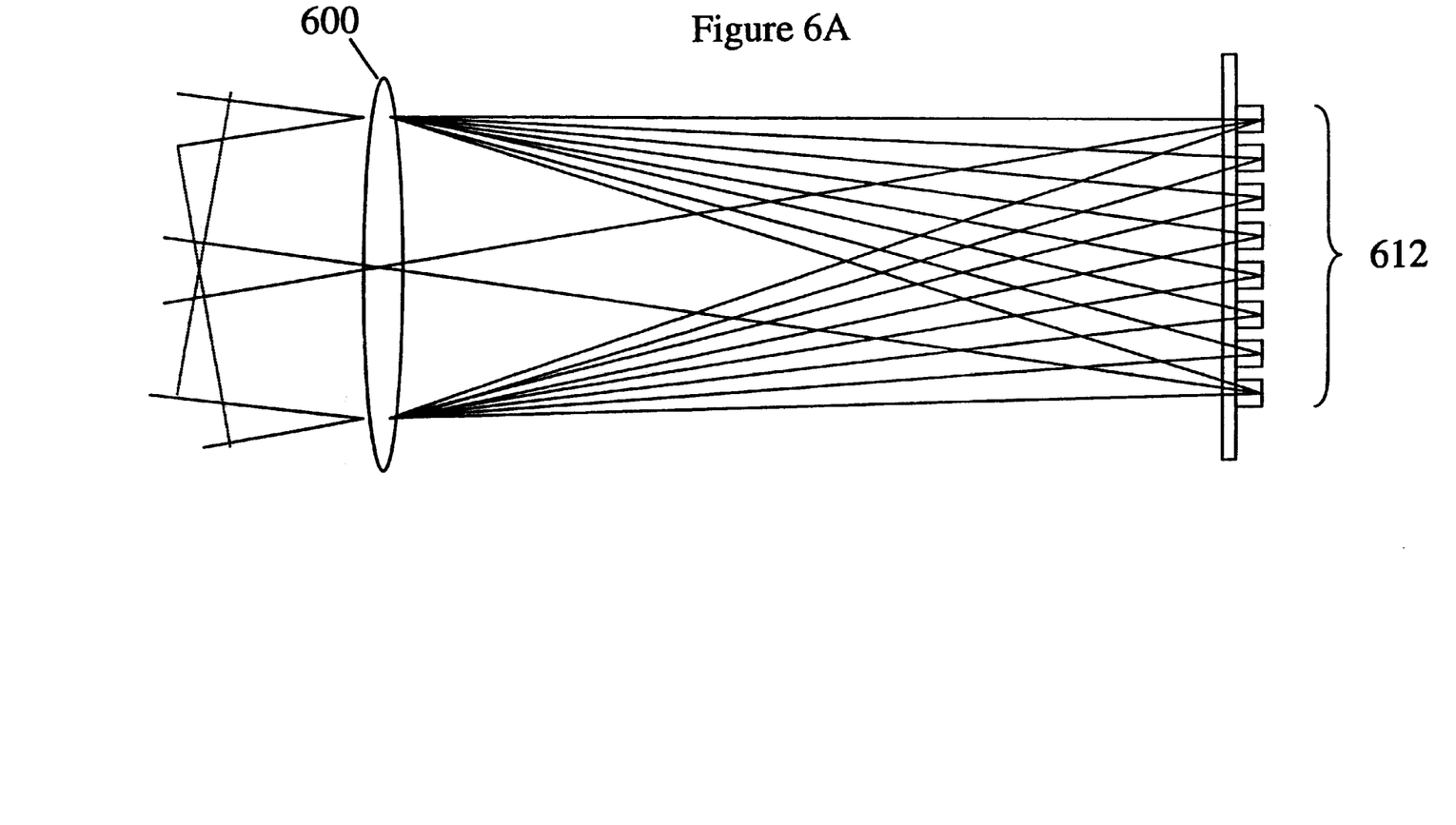
FIG. 6A illustrates generally a single lens configuration for focusing portions of a beam onto individual modulator mesas.
Figure 6B:
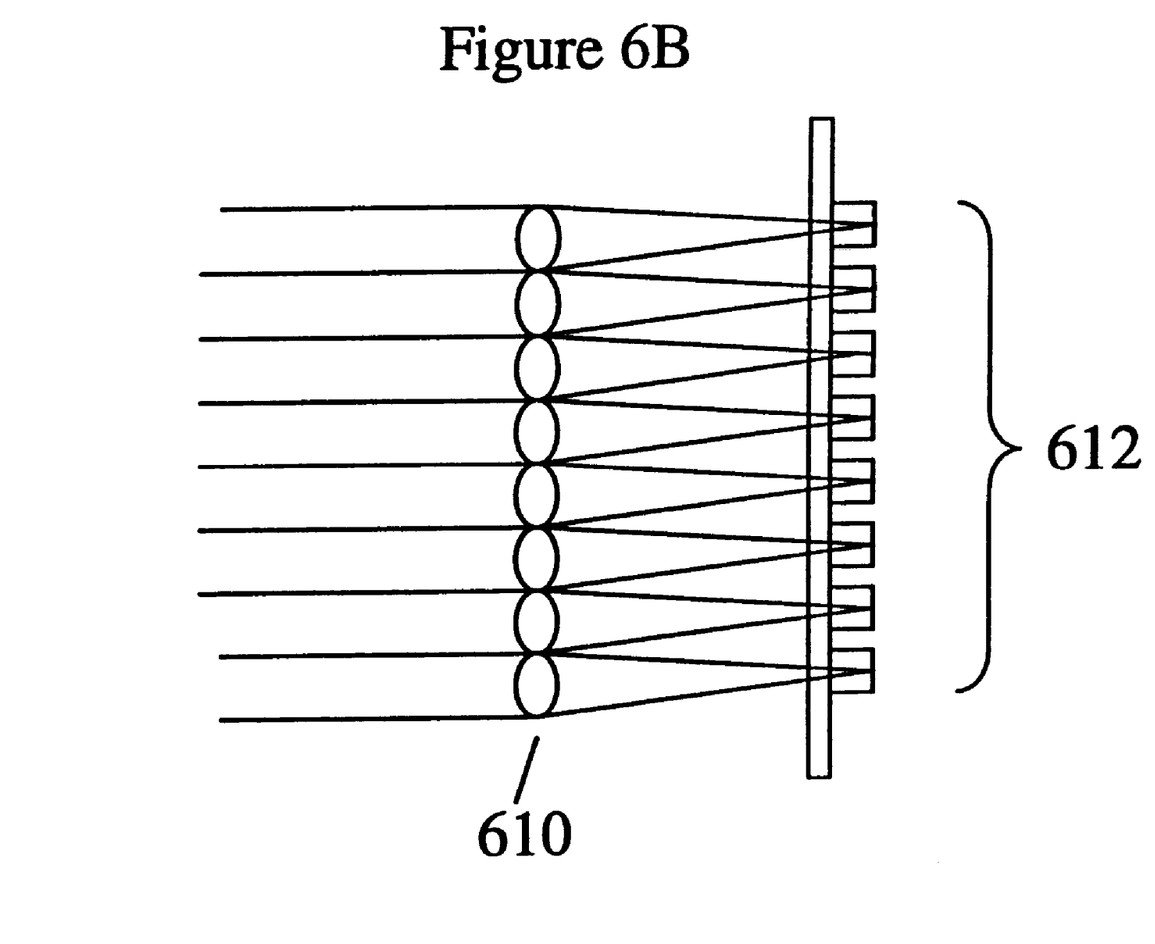
FIG. 6B illustrates generally a lenslet array configuration for focusing portions of a beam onto individual modulator mesas.

FIGS. 6A and 6B show the use of a single lens 600 and a lens-let array 610, respectively, to focus portions of a larger beam onto individual modulating elements 612. Modulating elements 612 may be configured as an array of mesas, such as any of the previously described arrays.

In the foregoing detailed description, the apparatus and method of the present invention have been described with reference to specific exemplary embodiments. However, it will be evident that various modifications and changes may be made without departing from the broader scope and spirit of the present invention. The present specification and figures are accordingly to be regarded as illustrative rather than restrictive.

What is claimed is:

1. An optical modulation apparatus comprising:
    an Elongated protrusion extending from a substrate, said elongated protrusion defining a light path and having an outer surface;
    a conductive element disposed on at least a portion of said outer surface;
    a reflective layer disposed on an end of said elongated protrusion; and
    an anti-reflective layer disposed on a surface of said substrate opposite said reflective layer.

2. The optical modulation apparatus of claim 1 wherein said elongated protrusion is integrally formed with said substrate.

3. The optical modulation apparatus of claim 1 wherein said elongated protrusion comprises a first material and said substrate comprises a second material.

4. The optical modulation apparatus of claim 3 wherein said first material is selected from the group consisting of: potassium dihydrogen phosphate, lithium niobate, lithium tantalate, ammonium dihydrogen phosphate, SrBaNiobate, BaNaNiobate and PLZT.

5. The optical modulation apparatus of claim 1 further comprising a voltage driving element electrically coupled to said conductive element.

6. The optical modulation apparatus of claim 5 wherein said elongated protrusion is capable of producing an optical phase delay in a light beam passing through said light path.

7. An optical modulation apparatus comprising:
    an elongated protrusion extending from a substrate, said elongated protrusion defining a light path and having an outer surface;
    a conductive element disposed on at least a portion of said outer surface;
    a first anti-reflective layer disposed on an end of said elongated protrusion; and
    a second anti-reflective layer disposed on a surface of said substrate opposite said first anti-reflective layer.

8. The optical modulation apparatus of claim 7 wherein said elongated protrusion is integrally formed with said substrate.

9. The optical modulation apparatus of claim 7 wherein said elongated protrusion comprises a first material and said substrate comprises a second material.

10. The optical modulation apparatus of claim 9 wherein said first material is selected from the group consisting of: potassium dihydrogen phosphate, lithium niobate, lithium tantalate, ammonium dihydrogen phosphate, SrBaNiobate, BaNaNiobate and PLZT.

11. The optical modulation apparatus of claim 7 further comprising a voltage driving element electrically coupled to said conductive element.

12. The optical modulation apparatus of claim 11 wherein said elongated protrusion is capable of producing an optical phase delay in a light beam passing through said light path.

13. An optical modulation apparatus comprising:
    a first substrate;
    an array of posts extending from said first substrate, each of said posts defining a light path and having an outer surface;
    an electrode coupled to said outer surface of each of said posts;
    a second substrate disposed over said array of posts; and
    a reflective layer covering an end of each of said posts.

14. The optical modulation apparatus of claim 13 wherein each of said posts is integrally formed with said first substrate.

15. The optical modulation apparatus of claim 13 wherein said posts are located at regular Intervals on said first substrate.

16. The optical modulation apparatus of claim 13 wherein each of said posts has a cross-sectional area having a dimension between approximately 10 microns and approximately 100 microns.

17. The optical modulation apparatus of claim 13 wherein each of said posts is individually electrically addressable.

18. The optical modulation apparatus of claim 13 further comprising a thermally conductive filler material between said second substrate and said array of posts.

19. The optical modulation apparatus of claim 13 wherein said second substrate comprises a surface having a plurality of conductive traces, wherein each electrode is electrically coupled to at least one of said conductive traces.

20. The optical modulation apparatus of claim 19 wherein said second substrate comprises a plurality of conductive vias coupled to said plurality of conductive traces.

21. The optical modulation apparatus of claim 13 wherein said first substrate and each of said posts comprise an electro-optic material, and wherein said second substrate comprises a thermally conductive material.

22. The optical modulation apparatus of claim 21 further comprising a heat sink coupled to said second substrate.

23. The optical modulation apparatus of claim 21 wherein said electro-optic material is selected from the group consisting of: potassium dihydrogen phosphate, lithium niobate, lithium tantalate, ammonium dihydrogen phosphate, SrBaNiobate, BaNaNiobate and PLZT.

24. The optical modulation apparatus of claim 13 further comprising a plurality of conductive traces on said first substrate, wherein each electrode is electrically coupled to at least one of said conductive traces.

25. A method of forming an optical modulation apparatus comprising:
    making a plurality of intersecting cuts into an electro-optic material, such that a plurality of protrusions extend from a substrate remaining from said electro-optic material;
    reducing the side surfaces of each of said protrusions;
    coating at least a portion of the side surfaces with an electrically conductive material; and
    connecting said electrically conductive material to a voltage driving element.

* * * * *